Patented June 11, 1935

2,004,789

UNITED STATES PATENT OFFICE 2,004,789

ACTIVE OR TOXIC SPRAY MATERIAL

Edmund L. Green, Washington, D. C., dedicated to the free use of the Government and the People of the United States No Drawing. Application September 16, 1932, Serial No. 633,464

1 Claim. (Cl. 167—16)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the same to the free use of the Government and the people of the United States.

My invention is of a new substance capable of being applied to plants as a suspension either in water as a spray, or in air as a dust. When so applied it serves the useful purpose of protecting the plant to which it is applied from the attacks of harmful micro-organisms such as certain fungi known to cause certain plant diseases.

Agricultural plants are commonly protected against the attacks of the fungi that cause plant diseases by placing upon the plant in any suitable manner a coating of a material which, while causing as little harm as possible to the agricultural plant, nevertheless prevents the growth and development of the spores of such disease-producing fungi as may subsequently fall or otherwise attach themselves to the surface of the plant, or preferably causes these spores to die. The object of checking the growth of the spores of the fungi, which are themselves a sort of plant, without causing excessive damage to the agricultural plants sought to be protected is difficult of attainment. It is the constant endeavor of experimenters working on these problems to improve the compounds and substances available for this purpose, either by reducing the damage to the agricultural (or "host") plants or by increasing their destructive effect upon the disease organisms.

Certain conclusions may be drawn from the successful fungicides now in use. For example the preparation known as Bordeaux mixture has a long record of successful use, and it is known that its harmful effect upon fungous diseases is due to the fact that it contains copper. It is also known that it is very insoluble in water, but that if in any way it is made soluble after it has been applied there is severe damage to the host plant. It would therefore appear that a copper compound that would be less readily dissolved by the plant and at least as readily by the secretions of the developing fungous spores should be more suitable than Bordeaux mixture in certain cases where the application of Bordeaux mixture must be avoided on account of causing too much damage to the host plant. Now Bordeaux mixture is made up by mixing together varying proportions of a solution of copper sulfate and of a suspension of slaked quick lime (calcium hydroxide). All the dissolved copper is or should be made insoluble during this process, and the resulting precipitate is sprayed or dusted upon the plant to be protected. It is known that by the time the copper compound reaches the foliage it is in a state of chemical combination which is described as a basic sulfate of copper. Of the compounds of copper I have found that copper silicate in a purified state should be used.

As an example of the application of this new material as a fungicide to be applied as a spray I may take from one to sixteen pounds of the finely ground copper silicate and an equal or greater quantity either of calcined lime, weighed out dry and slaked beforehand, or hydrated lime procured as such, and a suitable quantity of an insecticide if desired: for example, two pounds of lead arsenate, suspend all these ingredients in one hundred gallons of water and apply with a spray machine to any agricultural plants it is desired to protect with a copper-bearing fungicide from the attacks of the spores of pathogenic fungi.

As another example of a fungicide containing copper silicate to be applied as a spray, I may take from one to sixteen pounds of copper silicate, from two to thirty-two pounds of lime, either calcined lime weighed out dry and slaked beforehand, or hydrated lime procured as such, from five to twenty pounds of bentonite (see my co-pending application S. N. 633,463 filed September 16, 1932) and a suitable quantity of insecticide if desired; for example, two to ten pounds of lead arsenate. All these ingredients are to be suspended in one hundred gallons of water and applied with any spray device or machine to any agricultural plants it is desired to protect with a copper-bearing fungicide from the attacks of the spores of pathogenic fungi.

As an example of a fungicide preparation containing copper silicate to be applied as a dust with a blower, I may take one hundred parts of finely ground hydrated lime by weight, ten to twenty parts by weight of copper silicate, a suitable quantity of an insecticide if desired; for example, five to twenty parts by weight of lead arsenate, calcium arsenate, or zinc arsenite. The ingredients are to be thoroughly mixed and applied with any suitable dusting machine to any plants it is desired to protect from the attacks of the spores of pathogenic fungi with a copper-bearing fungicide.

As another example of a fungicide preparation containing copper silicate to be applied as a dust with a blower, I may take one hundred parts by weight of finely ground hydrated lime, ten to twenty parts by weight of copper silicate, a suitable quantity of a material found to improve the adherence or weather-resisting properties of the dust such as one to twenty parts by weight of finely ground dry casein or a preparation containing the same as one of its ingredients, and a suitable quantity of an insecticide if desired; for example, five to twenty parts by weight of lead arsenate, calcium arsenate or zinc arsenite, or one half to ten parts by weight of a suitable preparation containing nicotine as one of its ingredients. The ingredients are to be finely ground, thoroughly mixed, and applied with any suitable dusting machine to any plants it is desired to protect by means of a copper-bearing fungicide from the attacks of the spores of pathogenic fungi.

Although in the examples given above I have indicated ways of applying this patent that have been found to be useful and suitable and free to a large extent from narrow restrictions in the proportions of the various ingredients, I do by no means restrict myself to them nor exclude myself from the use of other ingredients and proportions of the same and other spreaders, such as bentonites, other colloidal clays, soaps, glues, saponaceous materials, materials other than soaps proteinaceous materials, and other materials well known in the present state of the art to be useful and suitable for this purpose, nor from combinations containing copper silicate and other well known insecticides and fungicides.

Copper silicate as described in this patent may also be used as an ingredient of a wound dressing in the treatment of large wounds of trees and shrubs resulting from accident or from necessary operations such as pruning. Because of the small danger of damage due to soluble copper when it is used there are few restrictions upon the nature and proportions of the other ingredients it may be combined with, except that it is safer to have some active calcium oxide, hydroxide or carbonate present. For this purpose copper silicate may be combined with tars or asphalts either occurring naturally or resulting from the distillation of wood, coal or oil, with oils, greases, fats or waxes, whether natural or artificial, with gums, resins, and pastes or with drying oils or paints. Thickening agents such as those named above may be even omitted altogether, and a mixture of copper silicate and lime suspended in water, glycerol or the like or mixtures of the same and applied to the wound. Insecticides may be added if desired.

I claim:

A plant spray, comprising copper silicate and lime.

EDMUND L. GREEN.